United States Patent [19]

Eklund

[11] 4,336,731
[45] Jun. 29, 1982

[54] BAND SAWING MACHINE HAVING MEANS TO APPLY CORRECTIVE TWIST TO THE BLADE

[75] Inventor: Urban Eklund, Soderhamn, Sweden

[73] Assignee: Kockums Industri AB, Malmo, Sweden

[21] Appl. No.: 132,287

[22] Filed: Mar. 20, 1980

Related U.S. Application Data

[63] Continuation-in-part of Ser. No. 873,263, Jan. 30, 1978, which is a continuation-in-part of Ser. No. 709,852, Jul. 29, 1976, Pat. No. 4,085,636.

[51] Int. Cl.³ .............................................. B23D 55/08
[52] U.S. Cl. ......................................... 83/74; 83/802; 83/820
[58] Field of Search ....................... 83/56, 72, 74, 809, 83/813, 820, 788, 802, 814

[56] References Cited

U.S. PATENT DOCUMENTS

| 455,980 | 7/1891 | Ballew | 83/441.1 X |
|---|---|---|---|
| 1,499,124 | 6/1924 | Reichmann | 83/820 X |
| 2,914,100 | 11/1959 | Lindholm | 83/74 |
| 3,327,696 | 6/1967 | Aiken et al. | 83/72 X |
| 3,452,734 | 7/1969 | Cleland et al. | 83/814 X |
| 3,664,223 | 5/1972 | Brocklehurst | 83/72 X |
| 3,882,742 | 5/1975 | Fukami | 83/820 X |

Primary Examiner—James M. Meister
Attorney, Agent, or Firm—Seed, Berry, Vernon & Baynham

[57] ABSTRACT

A band sawing machine has an endless saw blade entrained over two saw pulleys and two blade guides. Lateral displacements of the saw blade from a preset position occurring during a sawing operation are measured by a position sensor. The position sensor controls an actuator which applies a corrective twist or lateral movement to at least one of the blade guides to return the blade to the present position.

25 Claims, 10 Drawing Figures

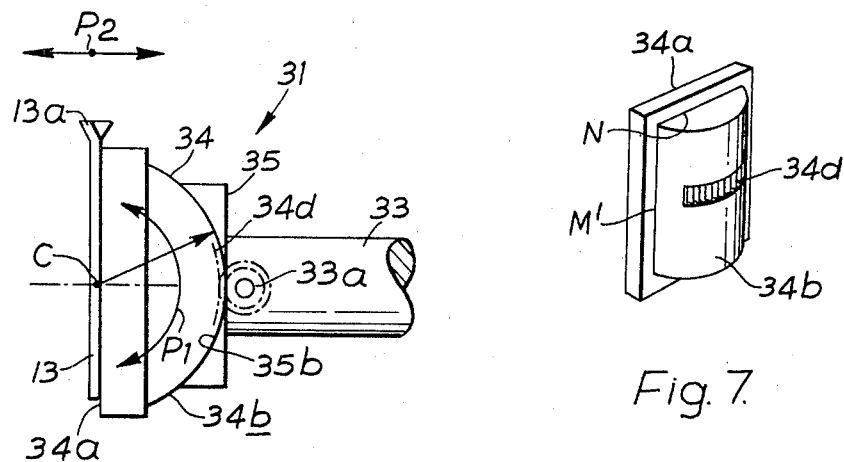
Fig. 6.
Fig. 7.
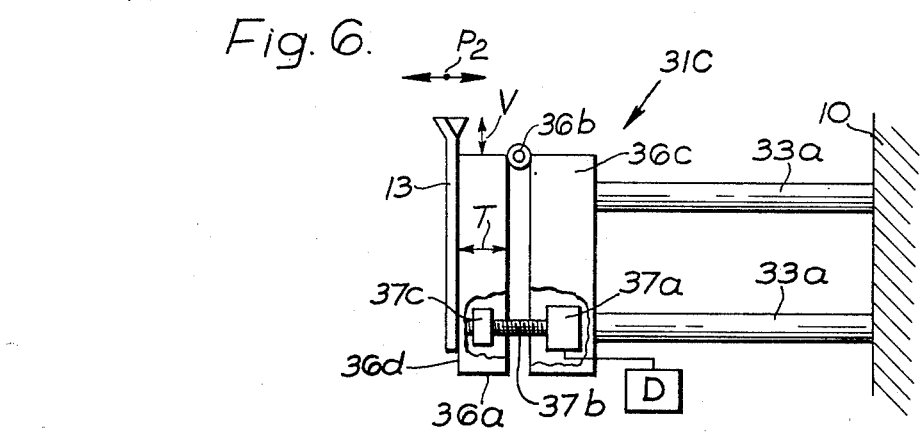
Fig. 8.
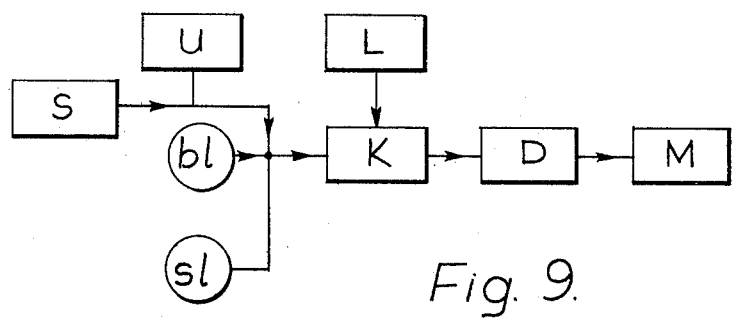
Fig. 9.

BAND SAWING MACHINE HAVING MEANS TO APPLY CORRECTIVE TWIST TO THE BLADE

CROSS REFERENCE TO RELATED APPLICATION

This application is a continuation-in-part of application Ser. No. 873,263, filed Jan. 30, 1978, which is a continuation-in-part of application, Ser. No. 709,852, filed July 29, 1976, now U.S. Pat. No. 4,085,636.

BACKGROUND OF THE INVENTION

1. Field of the Invention

This invention relates to a band sawing machine having an endless saw blade extending over two saw pulleys and two blade guides, and more particularly to a mechanism for applying corrective movements to the blade to maintain the blade in a predetermined position.

2. Description of the Prior Art

Blade guides such as are known in the prior art of band sawing machines for the most part serve only the passive role of stabilizing the saw blade during operational use. They generally comprise plates or front faces which are rigidly connected to the machine stand. In some types of band saws, one or both of the blade guides are displaceable as to height in order to allow the machine to accommodate different trunk diameters.

It has been found that, when sawing, the saw blade consistently tends to assume a so-called equilibrium position as a result of the forces of reaction prevailing in the saw blade during sawing. The equilibrium position can vary to some extend, due to different effects, as for instance, a somewhat varying feeding direction of the trunks. Accurate sawing requires that the sawblade occupies a preset, correct position so that the location of a cut can be predicted. In many band sawing machines, the correct position will be a plane which is tangent to the peripheries of both pulleys or which is parallel thereto. The equilibrium position can be displaced to either side of the correct position. It is apparent that the above mentioned lateral displacement has an adverse effect on accuracy of the sawing process.

U.S. Pat. No. 2,914,100, issued to Lindholm, discloses a band sawing machine which attempts to prevent displacement of the saw from determined correct cut position.

In the Lindholm band sawing machine, the saw blade is rotated 90° between the pulleys before the blade passes through a pair of spaced apart blade guides. Each of the blade guides include a slot having a pair of guide surfaces which the sides of the sawblade contact as the blade passes through the slot. The lateral positions of the blade guide are mechanically sensed and used to apply a corrective twist to the blade to return the blade to its correct position.

The blade position control mechanism used with the Lindholm device is inadequate for some purposes for a number of reasons. First, the depth of the cut is limited by the distance between the working portion of the saw blade and the opposite run of the saw blade, a distance which will practically correspond to the diameter of the saw pulleys. Obviously, this is quite insufficient for sawing such as long trunks or other elongated objects.

Second, mechanical position sensing requires a mechanical gauging element contacting the saw blade. The accuracy of measurements made by these structures are inherently degraded by such factors as sawdust, pitch, etc., coating the blades.

Third, the center of twist of the Lindholm device coincides with the teeth of the saw blade. Consequently, corrective twisting produces only an arcurate movement of the rear portion of the saw blade with the lateral position of the teeth remaining practically unchanged. While in some instances it may be sufficient, and even advantageous, to achieve the desired correction by a twisting of the blade in which the position of the row of teeth will remain unchanged, (in other words, where essentially only the inclination of the rest of the blade relative a zero reference plane passing through the row of teeth is changed), it is generally, and in certain specific cases particularly, preferable to have the corrective movement executed as a lateral displacement of at least the row of cutting teeth with the adjacent portion of the blade in a direction opposite to the sensed displacement.

Fourth, twisting the saw blade 90° can seriously reduce the useful life of the blade.

It is clear that the 90° twist of a fast running, continuous saw blade at two locations, and the subsequent continuous varying of the actual angle of twist, will result in a shortened blade life as compared with a blade which is subjected only to those relatively small position changes necessary for displacement compensation. Also a 90° twist precludes the use of the inherent blade tension alone to maintain the blade in contact with the guide surfaces of the guide so that a slotted blade guide must be used. Finally, corrective twisting of the blade which has been pre-twisted 90° is inherently nonsymmetrical and non-linear, i.e. the force required to twist the blade in one direction is not of the same magnitude required to twist the blade in the opposite direction.

SUMMARY OF THE INVENTION

It is an object of the invention to provide a mechanism for maintaining the position of a band sawing blade constant during a cut without degrading the useful life of the blade.

It is another object of the invention to provide a mechanism for maintaining the position of a band sawing blade constant which operates in a symmetrical manner and is thus inherently more accurate than conventional blade position control devices.

It is another object of the invention to maintain the position of a band saw blade constant in a manner which does not limit the depth of cut which the saw is capable of producing.

It is still another object of the invention to provide a blade position control mechanism for a band sawing machine which employs a non-mechanical position sensor.

It is a further object of the invention to provide a pair of space apart blade guides for controlling the position of the band saw blade in which the blade is held in contact with the blade solely by the inherent tension of the blade.

These and other objects of the invention are provided by a band sawing machine having a pair of spaced apart pulleys retainable about respective parallel rotational axes. A flexible, continuous band saw blade is entrained about the peripheries of the pulleys with the working portion of the blade occupying a plane which is essentially parallel to the rotational axes of the pulleys. A pair of spaced apart blade guides defining the working portion of the blade therebetween have generally planar guide surfaces which are substantially parallel to the rotational axes of the pulleys. Since the band saw blade is not twisted to any appreciable degree, the life of the blade is not degraded and the blade may be maintained in contact with the guide surfaces of the blade guide by the inherent tension of the saw blade. A non-mechanical position sensor measures the position of the blade between the blade guides and controls an actuator for moving the blade guides to place the working portion of the blade at a correct cut position throughout the cut. In one embodiment of the inventive band sawing machine, the corrective movement of the blade guide is a rectalinear movement in the lateral direction of the blade. Alternatively, the corrective movement may be a rotation of the blade guide about an axis parallel to the working portion of the saw blade in order to produce a slight twisting of the working portion of the blade. This twisting may, in one embodiment, be about an axis which is displaced from the teeth of the blade so that lateral shifting of the teeth is produced. However, under some circumstances, it may be desirable for the twist axis of the blade to coincide with the teeth of the blade so that the lateral position of the teeth remain constant as the blade undergoes corrective twisting. In any case, since the blade undergoes, at most, slight twisting, it occupies a plane corresponding to the lateral position and angle of the blade guide. The character of the corrective movement of the cutting teeth (twisting, lateral displacement or both) is thus determined by selecting the location of the twisting axis.

BRIEF DESCRIPTION OF THE DRAWINGS

FIG. 6 is a schematical view on an enlarged scale, in the direction of the arrows A in FIG. 1, and shows a first embodiment of a blade guide in a second group machine.

FIG. 7 shows in perspective and in a geometrical abstraction on a reduced scale, the rear cylindrical surface of the head portion of the FIG. 6 blade guide.

FIG. 8 shows schematically and on an enlarged scale, a second embodiment of a blade guide in a second group machine.

FIG. 9 shows a functional block diagram for the machine according to the invention.

DESCRIPTION OF THE SEVERAL EMBODIMENTS

Figure 1A:
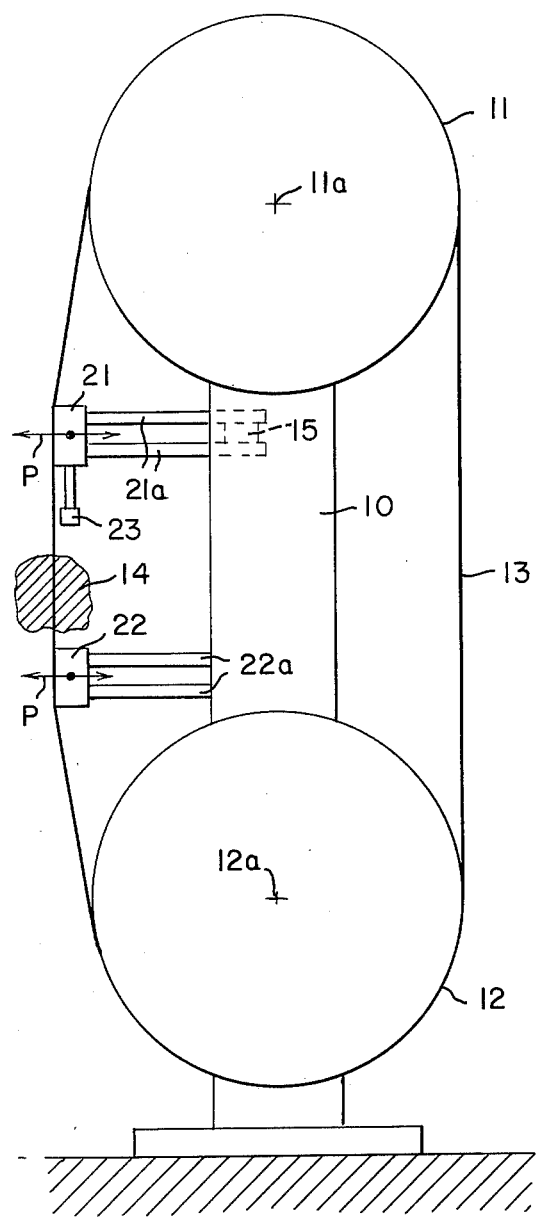
FIGS. 1a and 1b schematically show two band sawing machines according to the present invention in FIG. 1b.
Figure 1B:
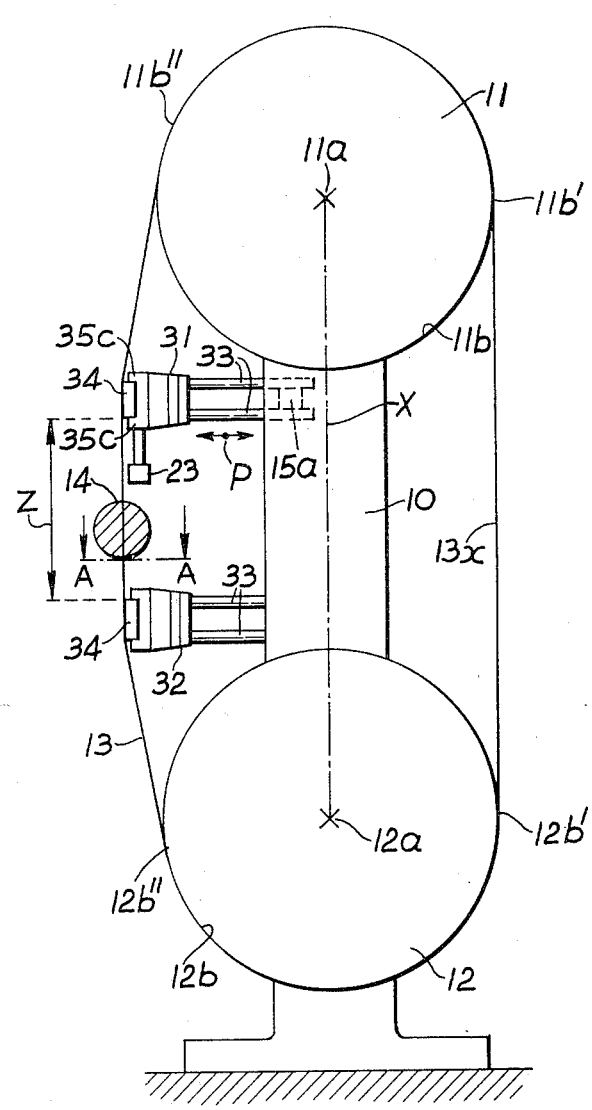

A band sawing machine, as illustrated in FIGS. 1a and 1b is provided with a machine stand 10 supporting an upper saw pulley 11 and a lower saw pulley 12 rotatable about axes 11a, 12a, at least one of which is driven by a motor (not shown).

The spacing between the blade guides 21, 22 or 31, 32 may be adjustable to allow the machine to accommodate trunks 14 with different diameters. Trunk 14 will be supported by any known type of transport device used in connection with a band sawing machine. A sensor or gauge S (FIG. 9) which may consist of one or several inductive coils 23, is mounted adjacent the saw blade 13 between the blade guides to measure the lateral position changes of blade 13.

Figure 2:
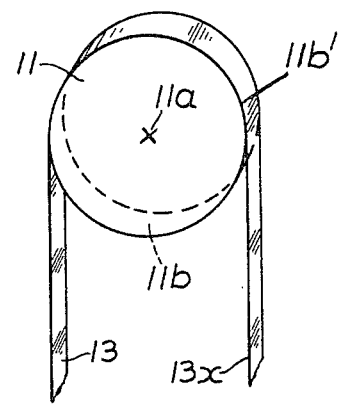
FIG. 2 schematically shows on a reduced scale and in perspective, one saw pulley of the FIG. 1 machine.

Each pulley 11 and 12 has a flat peripheral edge 11b (FIG. 2), 12b over which blade 13 runs. The rear branch 13x of the saw blade 13 between point 11b' of pulley 11 and point 12b' of pulley 12 represents a common tangential plane of the peripheries of the two pulleys 11, 12. The plane of blade 13 in the operative or working zone Z (FIG. 1b) thereof, between the two blade guides is in zero position parallel to the said common plane as well as to a common plane X (FIG. 1b) comprising the two axes 11a, 12a.

Figure 3:
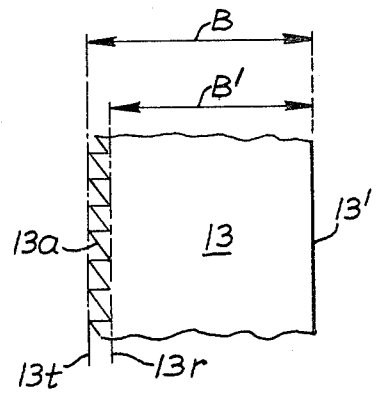
FIG. 3 shows schematically, and on an enlarged scale, a portion of an endless saw blade for use in the FIG. 1 machine.

As shown in FIG. 3, blade 13 has a rear edge 13' and a front edge defined by a row of cutting teeth 13a which extend between a top line 13t and a root line 13r. Blade 13 has a total breadth B between top line 13t and the edge 13', and a smaller breadth B' between root line 13r and rear edge 13'.

In one embodiment of the invention as illustrated in FIG. 1a, the two blade guides 21, 22 (or at least one of these) are mounted for lateral displacement, ie., in the direction of the arrows P perpendicularly to the common plane X. For instance, the band guides 21, 22 are mounted on support rods 21a, 22a which are slidably arranged in the stand 10. The support rods 21a, 22a are rectilinearly moved by a driving member 15 which is controlled by orders from a recalculation unit as explained hereinafter.

The alternative embodiment of the invention illustrated in FIG. 1b applies a corrective action to the saw blade 13 by rotating a guide surface 34 about an axis parallel to the rear branch 13x of the saw blade 13 or to the common plane X, so that the blade 13 in the working zone Z undergoes a small corrective twisting when necessary.

Figure 4:
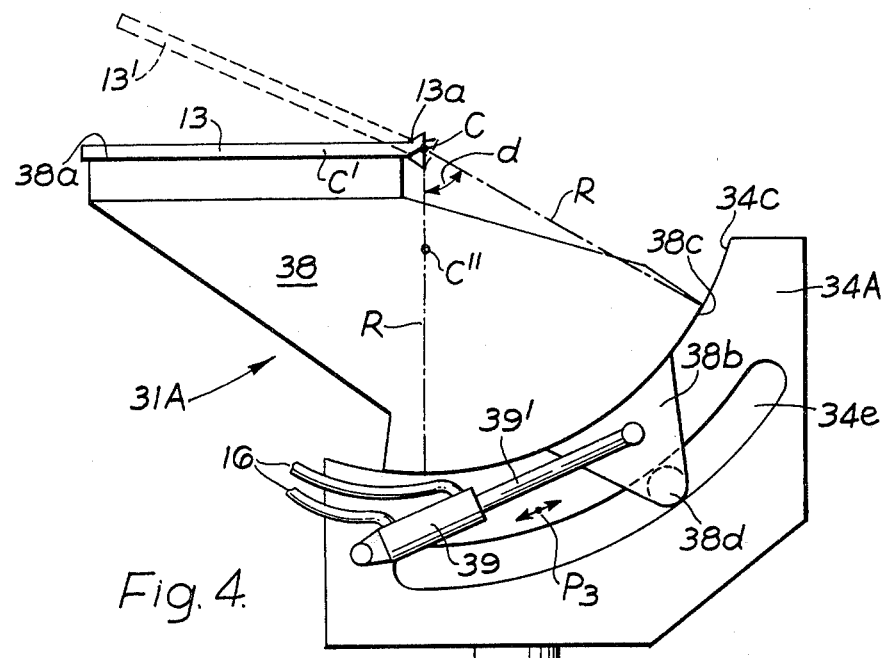
FIG. 4 shows schematically, and on an enlarged scale, a first embodiment of a blade guide in a first group machine.

One example of the embodiment of FIG. 1b is illustrated in FIG. 4. The blade guide 31A, supported on support bracket 33, has a base portion 34A to which the bracket 33 is attached. The opposite side of the base portion 34A is provided with a cylindrical surface 34c having a radius R centered on an axis C. A head portion 38 is movably connected to the body portion 34A with the aid of a rear cylindrical surface 38c matching cylindrical surface 34c. On the opposite side, head portion 38 is provided with a planar guide surface or face 38a for the blade 13. Blade 13, by its normal tension, is constantly pressed against this front face 38a essentially along the whole breadth B' extending beyond root line 13t of the row of cutting teeth 13a.

Head portion 38 is rotated by means of at least one guiding arm 38b, extending along at least one of the upper and lower faces of body portion 34A. Body portion 34A is provided with an arcuate slot 34e which is concentric with the cylindrical surfaces 34c and 38c, and thus also has its center of curvature in C. The slot 34e is slightly wider than the guide tap 38d so that this tap is emcompassed by the edges of the slot without any substantial play.

The center of curvature C is located in the row of teeth 13a of blade 13 running over front face 38a. The major portion of the rear cylindrical surface 38c contacting head portion 38 is in front of the row of teeth 13. By this arrangement, any rotation of head portion 38 about axis C causes an arcuate lateral displacement of rear edge 13' of the blade, as schematically shown in dotted lines, whereas, row of teeth 13a will substantially remain stationary. In some instances, this corrective movement will be found sufficient to compensate for a sensed blade displacement.

By appropriate modifying radius R and/or the position of surfaces 38c and 38a in relation one to another, center C easily can be located either elsewhere in the plane of blade 13 such as in location C', or even outside the plane such as in C''. Any such modification will produce an arcuate lateral displacement of teeth 13, in the same way as in the embodiments subsequently to be described in connection with FIGS. 6 to 8.

The head portion 38 is moved by at least one double-acting cylinder-piston assembly 39 extending between body portion 34A and the head portion 38. In response to a sensed displacement of the blade, the piston rod 39' moves in one of the directions of arrow $P_3$ to achieve the desired correction.

The double-acting cylinder-piston assembly 39 is fed by hydraulic fluid through a pair of lines 16 from a conventional source of pressurized fluid. For the elimination of an identical sensed displacement of the saw blade, a correction effectuated by a lateral shift of the row of teeth 13a requires a smaller rotation of the plane of saw blade 13 than when the correction is effectuated without a lateral shift of the row of teeth 13a; i.e. only by a twist of the remaining portion B' of the saw blade.

Figure 5:
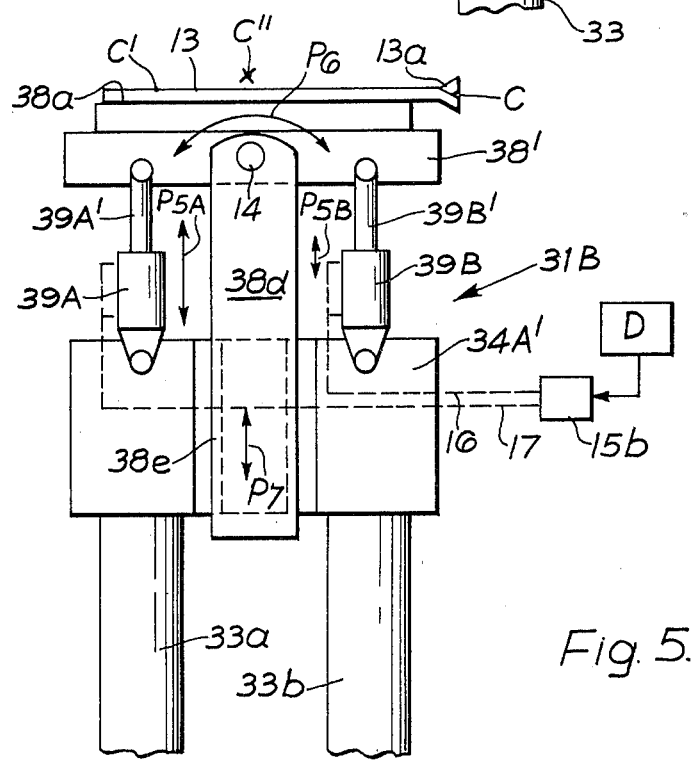
FIG. 5 shows schematically, and on an enlarged scale, a second embodiment of a blade guide in a first group machine.

According to FIG. 5, a blade guide 31b has a body portion 34A' which is connected to stand 10 by bracket means 33a, 33b which are arranged one next to the other. A head portion 38' with the planar guide surface of face 38a is movably connected to body portion 34A' by means of two hydraulically or pneumatically driven double-acting cylinder-piston assemblies 39A, 39B which are disposed one next to the other. The assemblies are pivotally connected to the body portion 34A'' as well as to the head portion 38'. One end of an elongated guiding rod 38d is pivotally connected to head portion 38' by means of a pivot tap 14, while its other end is slidably guided relative to body portion 34A' (i.e. with the aid of a dovetail guide 38e, as shown or in a similar manner, such as in a bore in the body portion 34A').

Double-acting cylinder-piston assemblies 39A and 39B with piston rods 39A' and 39B are, via two schematically shown pairs of feeding lines 16, 17, fed from a control unit 15b which in turn receives a pressurized medium from a source (not shown) in dependence on the sensed displacement of the blade, in accordance with an operative signal generated in a recalculator D (FIG. 9).

The control unit 15b is arranged so that in a manner known in the art, the unit 15b produces a differential output so that the pressure in assembly 39A varies inversely and/or in a different degree relative to the pressure in assembly 39B, as is schematically demonstrated in the drawing by the unequally long arrows $P_{5A}$ and $P_{5B}$.

The offset of unit 15b can be selected so as to place the axis of rotation of head portion 38' in a selectable location, inclusive of a location C in the row of teeth 13a of blade 13 passing over front face 38a, or a location C' elsewhere in the plane of the blade, or a location C'' outside the plane of the blade.

Guide rod 38d has a stabilizing function and is passively entrained in its guiding 38e in the direction of the arrow $P_7$ by head portion 38'. Head portion 38' executes a swinging motion in one of the senses of the arrow $P_6$ about a pivot tap 14.

More than one guiding member, and more than one cylinder-piston assembly on each side of the guiding member, can be used. Also, cylinder-piston assemblies 39A, 39B can be replaced by other driving means, such as by separate electrical motor driven screw-bolt-and-nut assemblies of the type disclosed in connection with FIG. 8.

According to FIGS. 6 and 7 a blade guide 37C is provided with a head portion 34 which, at the front side thereof, has planar guide surface 34a over which blade 13 runs. The rear side of the head portion 34 has a cylindrical rear surface 34b, the center of curvature of which preferably, but not necessarily, is located in the blade plane, i.e. in practice at the planar front face 34a.

Head portion 34 slidingly abuts a corresponding cylindrical surface 35b on a body portion 34. The two portions 34 and 35 are adjustably attached to each other, for instance in such a way that body portion 35 is provided with upper and lower abutments (not shown) which hold the head portion 34 relative the body portion in the vertical direction. The tensioned blade 13 itself presses head portion 34 against the body portion 35 and stabilizes the position thereof in the direction of bracket 33; i.e. horizontally.

Within the body portion 35 or the bracket 33, a gear 33a is arranged which meshes with an arcuate rack 34d, countersunk in the cylindrical surface 34b as illustrated in FIG. 7. The gear 33a is driven by conventional means (not shown), controlled by calculation unit D (FIG. 9).

Rotation of head portion 34 in the directions of arrow $P_1$ as illustrated in FIG. 6 causes the teeth 13a of the blade 13 to laterally shifted in the directions of arrow $P_2$. It should be noted that each of the movements produces a relatively slight twist of the blade 13 about its untwisted conditions since the saw blade is parallel with the common axial plane X (FIG. 1b).

Bracket means 33 are stationary during operation, but can be made adjustable as well for adaption to different saw blades or to vary the tension of the blades, and/or to accomodate trunks with different diameters.

In contrast to the embodiment of FIG. 4, the embodiment of FIG. 6 has a center of rotation C which can never be located in the row of teeth 13a although it may be located off the plane of the blade 13 if the radius of curvature of the cylindrical surfaces 34b, 35b is altered.

Still another embodiment illustrated in FIG. 8 utilizes a blade guide 31C which has a head portion 36a which is pivotally connected to the body portion 36c of the blade guide by a hinge 36b. The body portion 36c is attached to the machine stand 10 (FIG. 1) by a bracket means 33a. A driving means 37a such as an electrical motor mounted in or on the body portion 36c rotates a screw 37b that meshes with a nut 37c secured to portion 36a. The driving means 37a in its turn is controlled by operative signals from the calculator D (see also FIG. 9). The result obtained is a rotation of the head portion 36a with the planar guide surface face 36d and thereby also a rotation of blade 13 around an axis represented by the hinge 36b. This rotation applies a corrective twisting to the blade 13 and it also laterally shifts the row of teeth 13a in the directions of arrow $P_2$. It will be understood from the drawing that the extend of this lateral shift depends on the protrusion V of the top line 13t (FIG. 3) of the row of teeth 13a from the front edge of the head portion 36a, and on the thickness T of said portion, as both these magnitudes determine the distance between the top line 13t and the pivot axis represented by hinge device 36b. As both the said magnitudes in practice can be selected rather small, the embodiment according to FIG. 8 can functionally be assimilated to the embodiments of the first group according to FIGS. 4 and 5.

FIG. 9 illustrates a functional block diagram for controlling the movement of the blade guides of the band sawing machine according to the present invention. The sensor S (see for instance 23 in FIG. 1) measures the position of the blade laterally relative the adjacent blade guide. A settable compensator U corrects the output signal from the sensor for the specific geometry of the machine, etc. This corrected value is supplied together with information bl on the position of the blade guide relative to stand 10 and information sl on the position of stand 10 relative to the work 14 to be sawed to a comparator K. The information bl and sl can be generated by a conventional position sensor. The comparator K is also supplied by control unit L with the desired position of the blade and the row of teeth thereon, respectively, relative to the center line of the work to be sawed. The output value from the comparator which is proportional to the difference between its inputs, is supplied to a calculator D which generates an operative signal which is supplied to the driving means M. The driving means M then moves the head portion of the blade guide or blade guides, such as the driving member 15 according to FIG. 1 or the gear 33a (FIG. 6), the motor 37a and the screw bolt 37b (FIG. 8), the cylinder-piston assemblies 39A, 39B and the control unit 15b (FIG. 5) or the cylinder-piston assembly 39 (FIG. 4).

I claim:
1. A band saw machine comprising:
a machine stand;
an endless generally planar saw blade having a front edge and a rear edge and a row of teeth formed along the front edge and extending between a top line and a root line;
a pair of spaced-apart pulleys rotatable about respective parallel rotational axes mounted in a common plane on said machine stand, each pulley having a flat peripheral edge and said blade being tensionally disposed on and entrained over opposed portions of said edges on both pulleys such that a planar portion of said blade is maintained in contact with the flat peripheral edges of said pulleys;
a pair of spaced-apart blade guides carried by said machine stand, having a planar guide surface which is substantially parallel to said common plane, said planar surface of said blade being held in contact with said guide surfaces by the inherent tension of said blade such that said blade is free of substantial twist, the portion of the blade between the two blade guides defining a working zone of the blade which is substantially parallel to said common plane, the front face on at least one blade guide being displaceable, during sawing, relative to the machine stand;
a position sensor for continuously sensing, during sawing, lateral displacement of the said working zone of the blade from a position of correct cut and for generating a corresponding electrical signal;
a processing means for receiving the generated signal and processing it into an electrical operative signal; and driving means receiving the operative signal for applying a corrective force to said planar guide surface on at least one blade guide which is linearly proportional to said operative signal to cause said blade to move laterally in linear proportion to and in the opposite sense of the sensed lateral displacement of the blade irrespective of the direction of the sensed lateral displacement.

2. The machine of claim 1, wherein the guide surface of at least one blade guide is displaced relative the machine stand in a rectilinear translatorial movement perpendicular to the said common plane with said guide surface remaining parallel to said common plane such that the working zone of the blade is translatorily displaced free of twist.

3. A machine according to claim 2, wherein the blade guides are attached to the machine stand with a bracket means at least one of which is slidably mounted in the stand and actuated by the driving means so that the corrective movement of said planar guide surface is a rectilinear lateral displacement of the respective blade guide.

4. The machine of claim 1, wherein at least the guide surface on at least one blade guide is rotated out of a plane which is parallel to said common plane, so that the working zone of the blade is twisted out of said parallel plane with said teeth facing in a direction opposite the sensed lateral displacement.

5. The machine of claim 4, wherein the axis of the corrective twisting of said blade at said blade guides is spaced from the row of teeth and the root line thereof so that the blade undergoes a twist in which said row of teeth is shifted in a direction parallel to the said common plane as well as in a lateral direction perpendicular thereto.

6. The machine of claim 4, wherein the axis of the corrective twisting of said blade at said blade guide is coincident with the row of teeth so that the blade undergoes a twist in which said row of teeth remains fixed in a direction parallel to said common plane as well as in a direction perpendicular thereto.

7. The machine of claim 4, wherein at least one blade guide comprises a body portion affixed to the machine stand and a head portion movably mounted on said body portion and carrying said planar front face.

8. The machine of claim 7 wherein the head portion has a cylindrical rear surface abutting a corresponding cylindrical surface of the body portion.

9. The machine of claim 7, wherein the head portion has a cylindrical rear surface with a chord extending essentially parallel to and opposite to the planar guide surface and abutting a corresponding cylindrical surface of the body portion, the common axis of the cylindrical surfaces being spaced from the row of teeth of the saw blade running over the guide surface.

10. The machine of claim 9, wherein the cylindrical rear surface is provided with a rack for meshing with a driving gear of the driving means.

11. The machine of claim 9, wherein the body portion of each blade guide is movable relative to the machine stand for adjustment purposes.

12. The machine of claim 8, wherein the head portion has a cylindrical rear surface extending at least partially in front of the row of cutting teeth of the saw blade at the guide surface, said cylindrical rear surface abutting a corresponding cylindrical surface of the body portion, the common axis of both cylindrical surfaces passing through a selectable location inclusive of a location essentially within the row of teeth between the top and root lines.

13. The machine of claim 12, wherein the body portion is provided with at least one arcuate guiding track for at least one guiding member of the head portion, the center of curvature of the guiding track coinciding with the said common axis.

14. The machine of claim 7, the head portion being hinged and rotatively connected to the body portion, the driving means being coupled between the body portion and the head portion at a location spaced from the location of the hinged connection.

15. The machine of claim 7, wherein the head portion is connected to the body portion with at least one guiding member having one end slidably connected to the body portion and the other end pivotally attached to the head portion, and wherein driving means are positioned on opposite sides of the guiding member being the body portion and the head portion of the blade guide, the driving means being adapted for differential operation to produce a tilting of the front face about a selectively located center inclusive of the row of cutting teeth.

16. The machine of claim 1, wherein the position sensor is mechanically isolated from the blade and comprises at least one induction coil.

17. The machine of claim 16, wherein said position sensor includes an induction coil mounted adjacent said blade between said blade guides.

18. The machine of claim 1, wherein the driving means is at least one double-acting cylinder-piston assembly for a pressurized fluid.

19. The machine of claim 1, wherein the driving means is at least one screw-and-nut assembly operated by an electrical motor.

20. A band saw machine comprising:
a pair of spaced-apart pulleys rotatably mounted about respective rotational axes which are parallel to each other;
a continuous flexible band saw blade tensionally entrained about the opposed peripheries of said pulleys, said blade having a pair of generally planar surfaces extending between a pair of edges, at least one of said edges having formed therein a row of cutting teeth;
a pair of spaced-apart blades having substantially planar guide surfaces occupying a plane which is substantially parallel to a reference plane which is tangent to the peripheries of both pulleys;
a planar surface of said blade sliding on said guide surfaces and remaining in contact therewith by the tension of said blade such that a working portion of said blade between said blade guides is essentially parallel to said reference plane;
sensing means for measuring the lateral position of said blade perpendicular to the planar surface thereof with respect to a preset position and for generating a feedback single proportional thereto;
actuator means for applying a rotational moment to said blade guides about an axis parallel to the row of teeth at the working portion of said blade in proportion to said feedback signal in order to twist the working portion of said blade in a direction causing said teeth to face opposite the direction of lateral movement measured by said sensing means irrespective of the direction of the lateral movement, thereby causing the working portion of said blade to move said preset position.

21. The machine of claim 20, wherein the rotational axes of said blade guides are spaced from the teeth of said blade in a direction parallel to the rotational axes of said pulleys such that rotation of said blade guides responsive to lateral movement of said blade away from said correct position causes the teeth of said blade to move laterally in the opposite direction.

22. The machine of claim 20, wherein the rotation axes of said blade guides coincides with said teeth such that the lateral position of said teeth remains fixed as said blade undergoes rotation.

23. The machine of claim 1 or 20, wherein the portion of said blade contacting said blade guide is free of contact from any other structure such that said blade is held in contact with said blade guide entirely by the tension of said blade.

24. The machine of claim 20, wherein the position of said blade is measured by a position sensor which is mechanically isolated from said blade such that said sensor is free of contact from said blade.

25. The machine of claim 24 wherein said position sensor includes an induction coil mounted adjacent said blade between said blade guides.

* * * * *